No. 631,326. Patented Aug. 22, 1899.
S. ROUSE.
PLANTER.
(Application filed Apr. 11, 1899.)

(No Model.) 2 Sheets—Sheet 1.

Witnesses
L. C. Hills
A. W. Bishop

Inventor
Sylvester Rouse
By Chas. J. Donnelly & Co.
Attorneys

THE NORRIS PETERS CO., PHOTO-LITHO., WASHINGTON, D. C.

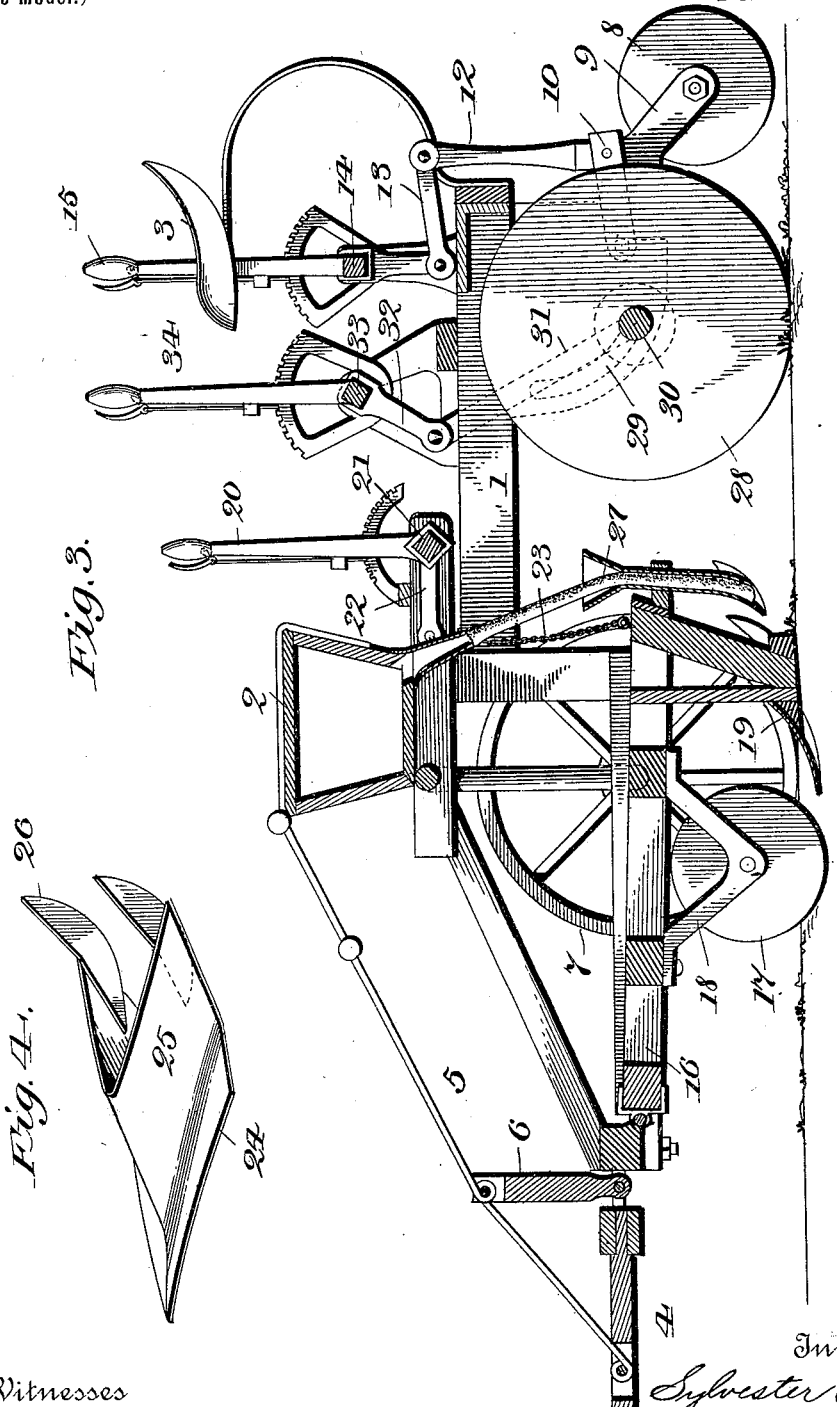

UNITED STATES PATENT OFFICE.

SYLVESTER ROUSE, OF NELSON, NEBRASKA.

PLANTER.

SPECIFICATION forming part of Letters Patent No. 631,326, dated August 22, 1899.

Application filed April 11, 1899. Serial No. 712,643. (No model.)

*To all whom it may concern:*

Be it known that I, SYLVESTER ROUSE, a citizen of the United States, and a resident of Nelson, in the county of Nuckolls and State of Nebraska, have invented certain new and useful Improvements in Planters, of which the following is a specification.

My invention relates to improvements in machines for planting small grain, especially fall wheat; and it consists in certain novel features, which will be hereinafter first fully described and then particularly pointed out in the claims.

Figure 1:
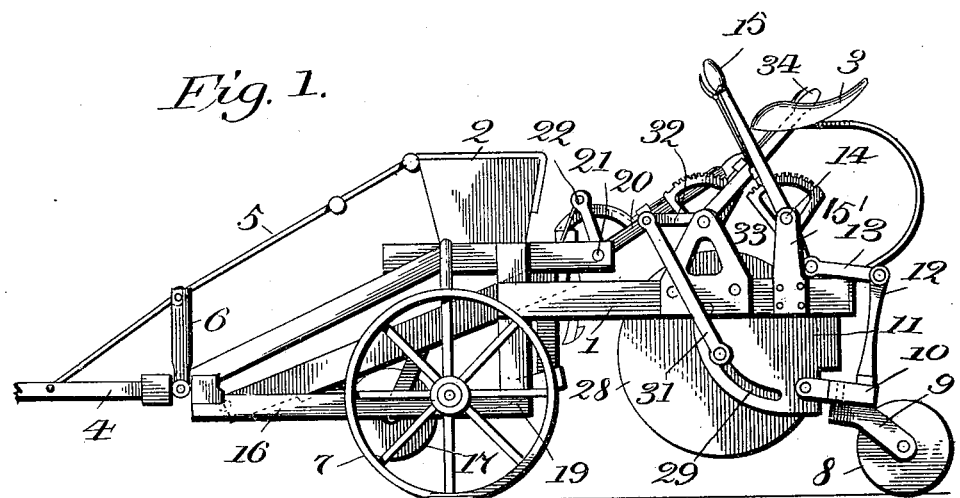
Figure 2:
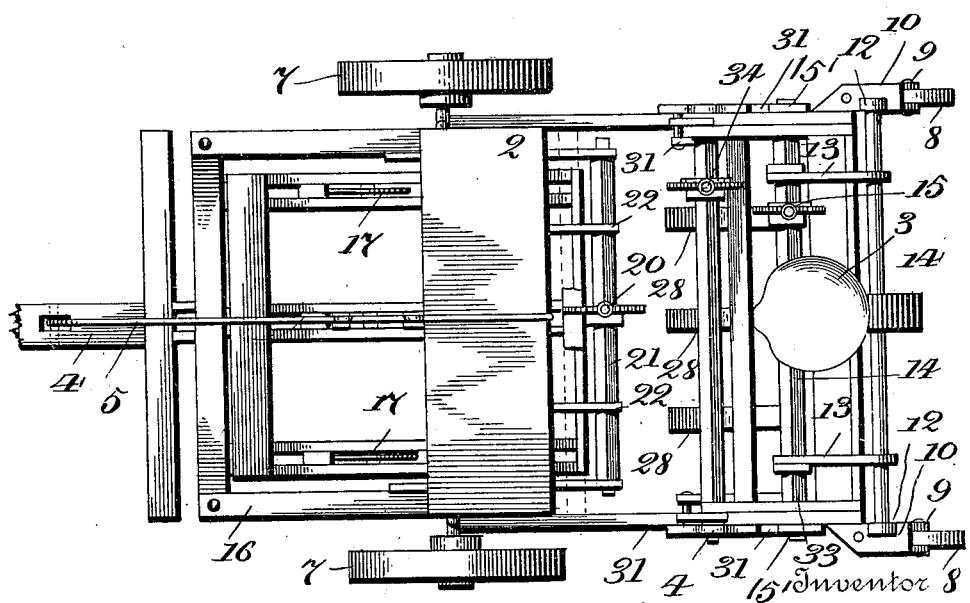

In the annexed drawings, which fully illustrate my improvements, Figure 1 is a side elevation of my planter. Fig. 2 is a plan view of the same. Fig. 3 is a vertical longitudinal section thereof, and Fig. 4 is a detail view of one of the plows.

The main frame 1 of the planter consists of the usual beams and cross-bars, and mounted upon the frame is an ordinary seedbox 2 and a seat 3, the seat being arranged at or near the rear end of the frame. Attached to the front end of the frame is a tongue 4, and extending from the seedbox to the tongue is a brace 5, which passes over and is attached to a short standard 6, rising from the pivotal connection between the tongue and the frame. The weight of the tongue is thus taken from the necks of the team and the strain exerted thereby is taken up by the frame and the seedbox. Suitable carrying-wheels 7 are mounted on the sides of the main frame just about under the seedbox, and caster-wheels 8 are provided at the rear end of the frame to facilitate turning of the machine or the transportation of the same from one field to another. These caster-wheels are not mounted directly on the frame, but are hung in the lower ends of forks 9, which are swiveled in the arms 10, pivoted on brackets 11, depending from the frame. Rising from the outer ends of the arms 10 are standards 12, to the upper ends of which are pivoted the outer ends of links 13, which are pivotally connected with and extend rearward from cranks which depend from a rock-shaft 14, said rock-shaft being journaled in uprights 15' on the frame and being provided with an operating-lever 15, which may be easily reached by the driver when seated. In the normal position of the parts the caster-wheels are raised from the ground, as shown in Fig. 3. When it is desired to turn the machine or transfer it to another field, the lever 15 is thrown forward, thereby carrying the cranks 13 rearward and causing the arms 10 to swing downward on their pivots, so as to carry the caster-wheels to the ground, as shown in Fig. 1.

A supplemental frame 16, consisting of a gang of beams, is hinged to the front end of the main frame, as clearly shown in Figs. 2 and 3. Colters or cutting-disks 17 are journaled in brackets 18, depending from these beams at about the centers thereof, and to the rear end of each beam is secured a plow 19. The gang of plows and colters is raised and lowered by means of a lever 20, mounted on the main frame in rear of the seedbox, by having its lower end formed integral with or rigidly secured to a rock-shaft 21, journaled in the frame. Crank-arms 22 extend forward from the rock-shaft, and chains 23, depending from said crank-arms, connect them with the gang of plows and colters. The plows are so formed as to loosen the earth without turning it, and they consist of substantially V-shaped shovel-blades having a flat cutting edge 24, with a slightly-rising moldboard 25 in rear of the same. At the ends of the moldboard are wings 26 to cut and pulverize the earth. The seed-tubes 27 correspond in number with the plows and colters and extend from the seedbox to points just behind the plows.

In rear of the plows and in advance of the caster-wheels is a series of rollers or covering-wheels 28, mounted on an axle 30, which plays in a curved slot 29 in the bracket 11. Links 31 extend upward from this axle and have their upper ends pivoted to the front ends of crank-arms 32, which project forward from a rock-shaft 33, suitably mounted on the main frame. A lever 34, secured to and rising from the rock-shaft, is utilized to oscillate the same.

The construction and arrangement of the several parts of the machine being thus made known, it is thought the operation will be readily understood. The seedbox is filled with seed and the machine is driven over the field in the usual manner. The colters or cutting-disks will cut through the earth and the plows following immediately behind will loosen and pulverize the soil without turning it. This result will be especially appreciated when working in old stubble-fields, as the stubble will be left on the surface instead of being turned into the furrow. The seed will drop in the path made by the plows and the covering-rollers will then press the loose dirt over the seed. Choking of the plows by stubble is avoided by reason of their own formation and also by reason of the cutting-disks running immediately in advance of them and cutting a path for them. When the edge of the field is reached, the several levers are manipulated to raise the plows, colters, and coverers and lower the caster-wheels, so that the machine may be easily turned or moved to another field. When in position to plant another row, the caster-wheels are raised and the working elements lowered, after which the machine is operated as before.

It will be readily observed that the machine is free of complicated arrangements, so that repairs may be quickly made, and that the several parts are so combined as to acquire the maximum efficiency.

Having thus described my invention, what I claim, and desire to secure by Letters Patent, is—

1. In a planter, the combination with the main frame, and the tongue hinged thereto, of a short standard rising from the connection between the frame and the tongue, and a brace extending from a fixed portion of the frame to the tongue and pivotally connected to the upper end of the said standard.

2. The combination with the frame and brackets depending therefrom, of rearwardly-projecting arms pivoted to said brackets, caster-wheels swiveled in said arms, standards rising from the outer ends of said arms, a rock-shaft mounted on the frame and provided with cranks, and links connecting said crank-arms with the upper ends of the standards.

3. The combination with the frame and brackets depending therefrom and provided with curved slots, of arms pivoted to and projecting rearwardly from said brackets, caster-wheels swiveled in said arms, means for raising and lowering said arms, an axle having its end mounted and playing in the slots in said brackets, a rock-shaft mounted on the frame and having crank-arms, links connecting the crank-arms with the axle, and an operating-lever on said shaft.

In testimony whereof I have set my hand in the presence of two witnesses.

SYLVESTER ROUSE.

Witnesses:
S. A. LAPP,
R. D. SUTHERLAND.